United States Patent [19]

Deutsch

[11] 4,148,619

[45] Apr. 10, 1979

[54] FLASK AND MECHANICAL AERATOR

[76] Inventor: Daniel H. Deutsch, 141 Kenworthy Dr., Pasadena, Calif. 91105

[21] Appl. No.: 825,944

[22] Filed: Aug. 19, 1977

[51] Int. Cl.[2] .................. B01D 50/00

[52] U.S. Cl. .................. 55/385 R; 55/473; 261/75; 261/85; 195/127; 195/142; 422/102; 416/79; 417/211

[58] Field of Search .................. 55/467, 471–473, 55/385 R; 210/169, 238; 261/81, 75; 128/42; 415/213 R, 213 C; 195/127, 142; 416/79, 80; 417/211; 422/102

[56] References Cited

U.S. PATENT DOCUMENTS

| | | | |
|---|---|---|---|
| 268,821 | 12/1882 | Pennie | 137/527.8 |
| 509,892 | 12/1893 | Gray | 55/487 |
| 593,930 | 11/1897 | Fraser | 138/42 |
| 717,339 | 12/1902 | Burrows | 415/213 R |
| 1,072,635 | 9/1913 | Moore | 55/405 |
| 1,276,225 | 8/1918 | Jackson | 416/79 |
| 2,096,262 | 10/1937 | Roth | 55/385 R |
| 2,152,243 | 3/1939 | Daiger | 416/80 |
| 2,272,356 | 2/1942 | Sims | 98/33 A |
| 2,871,575 | 2/1959 | Dupont | 259/4 R |
| 3,040,976 | 6/1962 | Je Mattos | 417/36 |
| 3,599,401 | 8/1971 | Rich | 417/436 |

*Primary Examiner*—Bernard Nozick
*Attorney, Agent, or Firm*—Edgar W. Averill, Jr.

[57] ABSTRACT

An aerator for use in the neck of a flask for increasing the flow of gas from the exterior to the interior of the flask. The aerator has a gas-impervious exterior wall a plurality of gas moving members are positioned within the wall and tend to urge gas through the aerator.

10 Claims, 3 Drawing Figures

FLASK AND MECHANICAL AERATOR

BACKGROUND OF THE INVENTION

In bacteriological research and development the sterile shake flask is used extensively. Commonly, a plug of cotton is used to keep the contents of the flask sterile and to permit the exchange of ambient air with the gases in the flask.

A major shortcoming of this very simple system is the slow rate of gas exchange through the cotton plug. Consequently, the gas exchange through the cotton plug is rate limiting rather than the biological process in the bacteriological medium. Elaborate sterile gas pumping systems have been developed and used to increase the rate of air through put. However, such systems are quite expensive, complicated to operate and maintain and provide a source of contamination.

SUMMARY OF THE INVENTION

It is thus an object of the present invention to provide an aerator which is simple to use, and inexpensive to maintain and yet effective to increase the flow of ambient gas into and out of a flask or other vessel on a shake table.

The aerator has a gas-impervious exterior wall having an opening at the upper and lower ends thereof. A screen or other porous member is affixed to both the upper and lower ends of the wall to prevent the entrance of cotton or other material into the interior of the aerator. A plurality of hinged movable members are affixed to the inner wall of the aerator, each of these members tends to move the gas through the aerator. The aerator may be housed in a cylindrical wall and a plurality of half discs are hingedly suspended in the interior of the wall. The wall may have a square, rectangular or other cross-sectional shape in which case the moving members would be square, rectangular or otherwise conformed to the interior shape of the wall.

DESCRIPTION OF THE PREFERRED EMBODIMENTS

Figure 1:
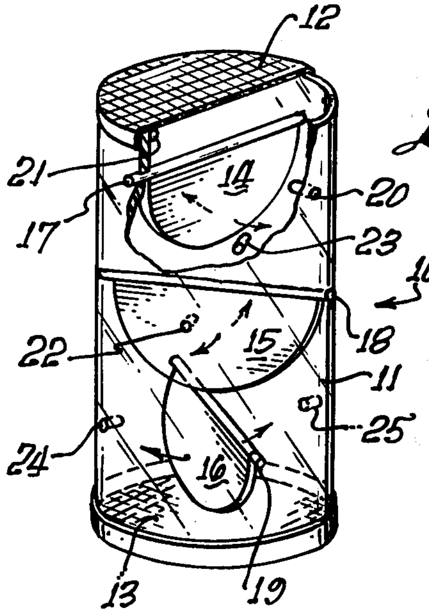
FIG. 1 is a perspective view partially cut away of an aerator of the present invention.
Figure 2:
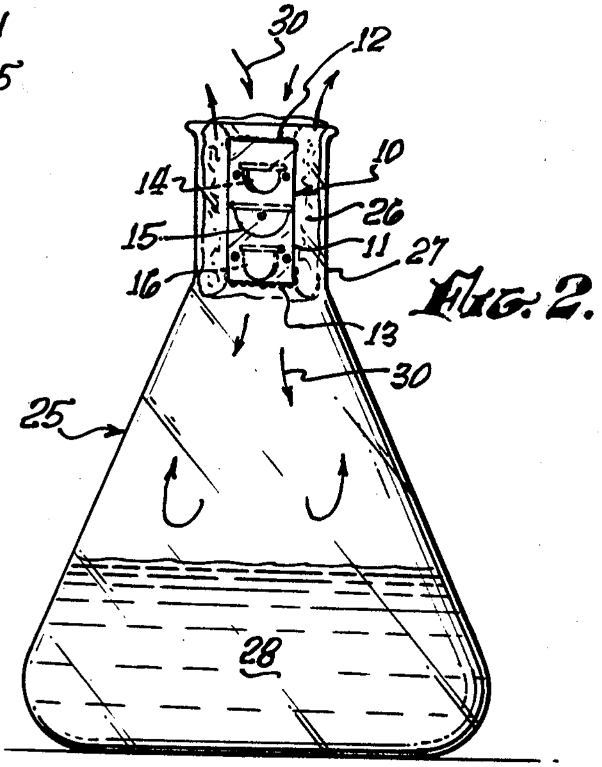
FIG. 2 is a side elevation partially cut away showing the aerator of the present invention in the neck a flask.

The aerator 10 of FIG. 1 has a cylindrical wall 11 which may be made from a glass tube or other hollow cylindrical member. A screen 12 is positioned over the upper end of wall 11 and screen 13 is positioned over the lower end. These screens serve to prevent the entry of cotton or other material to the interior of the aerator in that such materials would tend to decrease the effectiveness of the aerator.

Within wall 11 is a plurality of vanes 14 through 16. Vane 14 is hingedly supported by a pin 17 and vane 15 is supported by pin 18 and vane 16 supported by pin 19. The movement of vane 14 is limited by a pair of stops 20 and 21 and similarly vane 15 is limited in movement by stops 22 and 23. Likewise, vane 16 is held within a fixed arc by stops 24 and 25. These stops may be pins which protrude through the tube or wall 11 or other members which prevent a vane from swinging above a horizontal position. With some configurations of vanes, such stops are not necessary. The vanes of the aerator of FIG. 1 are half discs supported along their bisecting edge.

In operation, the aerator 10 is placed in the neck of a shake flask 25. A plug of cotton 26 holds aerator 10 within neck 27 of flask 25. A reaction medium 28 is held within the flask 25. Reaction medium 28 may be a fermentation medium or other medium which utilizes a gas from the exterior of the flask and the insertion of aerator 10 into the neck of shake flask 25 increases the flow of gas in the manner indicated by arrows 30.

In operation, aerator 10 has the ability to increase the flow of gas by the action of the three free-swinging vanes 14 through 16. The vanes and pins are preferably mounted symmetrically around the vertical axis of the tube with small clearance between adjacent vanes. Since many biological reactions are carried out in a flask which is constantly shaken on the shake table the movement of the flask tends to cause the vanes to swing back and forth and fan or otherwise cause the gas to move downwardly through the aerator. The gas which is displaced from the flask by the movement through the aerator passes outwardly through the cotton wad 26.

The aerator of FIG. 1 may be constructed of metal, glass, plastic, ceramic, or other material which will withstand the environment in which the aerator is to be used. Considerations such as corrosion resistance and ability to be sterilized by steam or chemicals will affect the choice of material.

Figure 3:
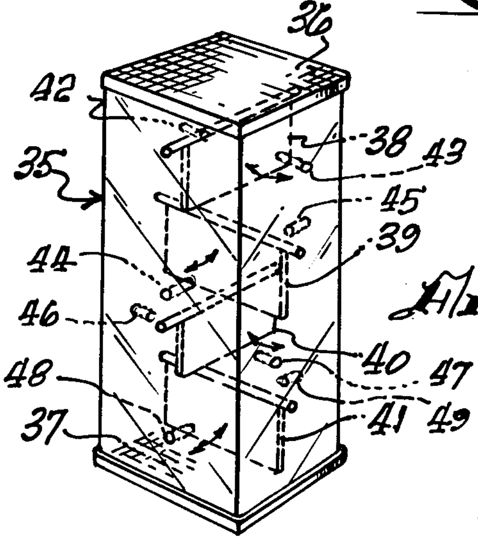
FIG. 3 is a cross-sectional view of an alternate configuration of the aerator of the present invention.

As shown in FIG. 3 the aerator may have a rectangular body such as that indicated by reference character 35. A pair of screens 36 and 37 perform the same functions as the screens 12 and 13 in FIG. 1. Vanes 38 through 41 swing back and forth in a manner analogous to the vanes of the aerator FIG. 1 thus fanning the gas downwardly. The pins 42 through 49 act as stops keeping the vanes below the horizontal position. Preferably, the vanes should be made of a relatively heavy material so that they tend to stay in a downward configuration and are moved by the action of the shake table. By moving the vanes further apart, the stops would be eliminated.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. An apparatus for moving gas downwardly into the neck of a shaking flask, said apparatus comprising:

a shaking flask having a neck portion;

an aerator supported in the neck of said flask, said aerator having a gas-impervious exterior wall having an opening at the upper and lower ends thereof; and at least one free-swinging, hingedly-supported, downwardly-depending member affixed within said wall, whereby the shaking of the flask causes the member to swing back and forth resulting in a fanning action thus moving gas downwardly through the openings in the wall.

2. The aerator of claim 1 wherein screen means are affixed across the upper and lower openings of said wall.

3. The aerator of claim 1 wherein there are a plurality of said members.

4. The aerator of claim 3 wherein said wall has a rectangular cross section, said members are rectangular and said members are hingedly suspended from one side thereof.

5. The aerator of claim 4 further including a plurality of stope which prevent said members from rising substantially above the horizontal plane of the side from which the members are supported.

6. The aerator of claim 3 wherein said wall is cylindrical and said members comprise half discs suspended from the bisecting edge thereof.

7. The aerator of claim 6 having three half discs.

8. The aerator of claim 7 wherein each half disc is in a different axial position with respect to every other half disc.

9. The aerator of claim 6 further including a plurality of stops which prevent said half discs from rising substantially above the horizontal plane of the bisecting edge.

10. The aerator of claim 9 wherein said aerator has three hingedly supported members.

* * * * *